March 11, 1941.  C. A. OLCOTT  2,234,574
BEARING OF GYRATORY CENTRIFUGAL DEVICES
Filed Oct. 9, 1939   2 Sheets-Sheet 1
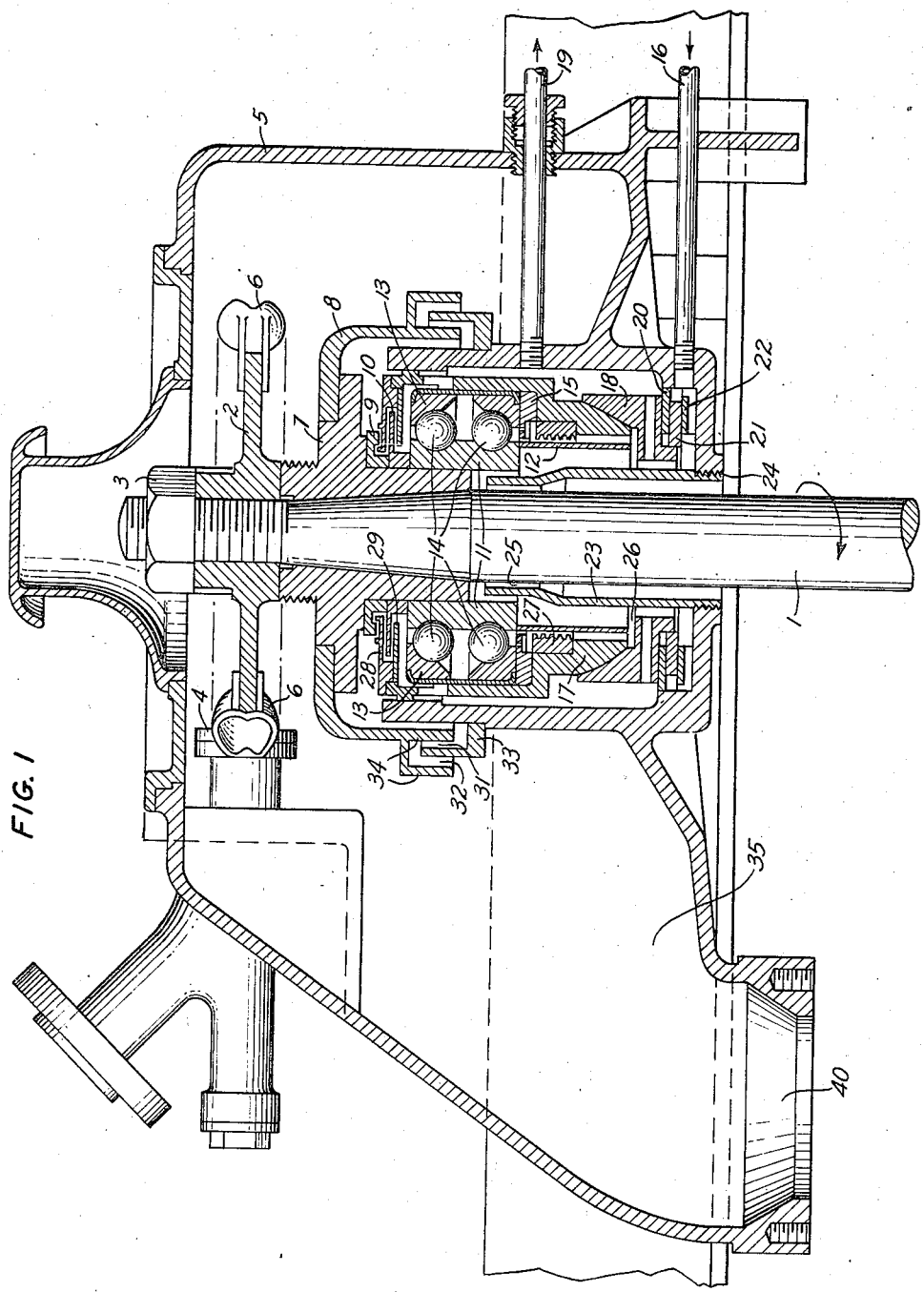
FIG. I
INVENTOR
C. A. OLCOTT
BY
ATTORNEY

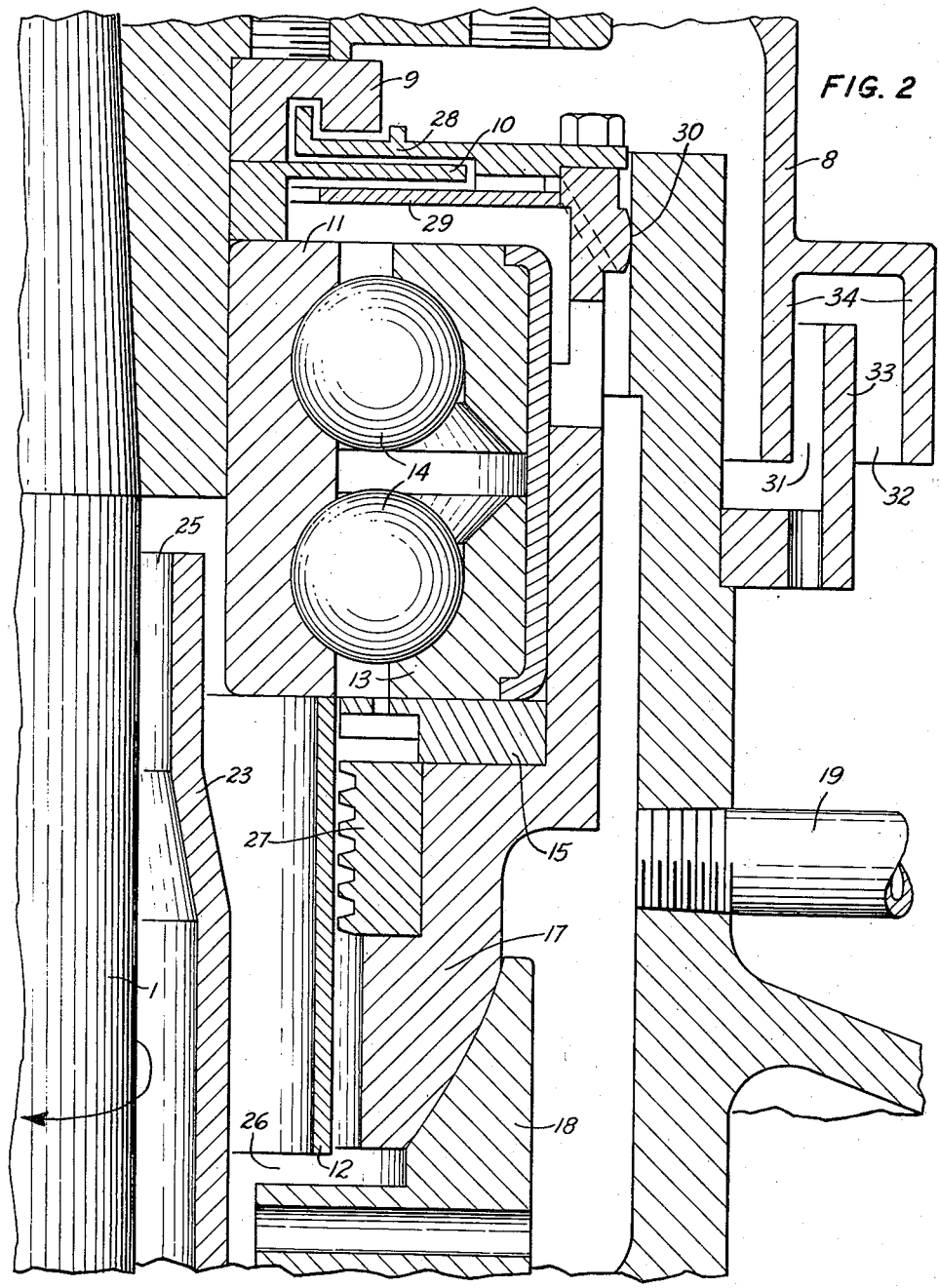

Patented Mar. 11, 1941

2,234,574

UNITED STATES PATENT OFFICE 2,234,574

BEARING OF GYRATORY CENTRIFUGAL DEVICES

Charles A. Olcott, West Milford, N. J.

Application October 9, 1939, Serial No. 298,631

5 Claims. (Cl. 308—187)

This invention relates to a system of bearings and more particularly to bearings of gyratory centrifugal devices.

An object of this invention is to lubricate a gyratory centrifugal device efficiently and economically.

Another object of this invention is to conserve the material required for the lubrication of a gyratory centrifugal device.

A more specific object of this invention is the prevention of the escape of lubricating oil from centrifuge bearings.

In the operation of certain types of gyratory centrifugal devices at high speed, the lubricating medium such as oil employed for the lubrication of the bearings of such devices disperses into a fine spray by the rapidly rotating mechanism and is carried away by the air currents. This condition is particularly prevalent with devices operating at relatively high speeds, for example, at 1800 R. P. M. In time, this condition either causes failure of the bearings or requires an excessive amount of oil to be supplied to the bearings. A seal between the rotor and stator elements above the bearings and consisting of material such as felt or leather could not withstand the destructive action resulting from friction at high speed. One variety of seal widely used for this general purpose, the labyrinth seal, while effective at low speed, does not of itself prevent the oil from being drained entirely out of the bearing chamber. Many other seals have been heretofore proposed but none is sufficiently effective at high speeds to prevent the escape of oil from the lubricating system in such quantities that lubrication frequently fails.

In accordance with this invention, the escape of the lubricating medium from the bearings of gyratory centrifugal devices is prevented. A passage from a chamber containing the lubricating medium to the bearing is so constructed that while permitting the oil to travel to the bearing, it effectively prevents air from flowing therethrough. With this construction, when the centrifugal is operating at high speeds, the bearing is continuously supplied with oil or other lubricating medium and the oil is dispersed into a fine spray but no air currents flow out of the oil chamber to carry the spray away.

In a specific embodiment, the bearing of a centrifugal device is provided with a slinger or hanger which rotates at the same rate as the spindle of the device. The slinger, located below the bearing, extends into a chamber of oil. In its rotation, the slinger forces the oil up into the bearing. Concentric with this slinger, and between the lower driving part of the slinger and the bearing, a stator element is located which effectively permits the oil to be supplied to the bearing but prevents air from passing through the passage between the slinger and the stator element. Preferably, the stator element is provided with grooves and it is desirable that these grooves be threaded in a direction so that when taken in conjunction with the direction of rotation of the spindle, the rotor element acts to force the oil in the grooves downward against the tendency of the slinger to cause the oil to flow upward to the bearing. In this structure, a seal of oil in the passage prevents air currents being generated by the rapidly moving parts from passing through and out of the oil chamber, carrying the oil with them. A labyrinth type of seal might also be conveniently employed above the bearing.

A more comprehensive understanding of this invention is obtained by reference to the accompanying drawings in which:

Fig. 1 shows a sectional view of an embodiment of this invention; and

Fig. 2 illustrates a more detailed sectional view of the device shown in Fig. 1.

The invention in its preferred embodiment is shown as applied to centrifugal bearings of the type shown in U. S. Patent 1,443,884 granted to C. A. Olcott on January 30, 1923, but it is understood that the invention is not limited to this specific type of bearing but may be applied to other types of bearings.

In Figs. 1 and 2, a spindle 1 of a centrifugal machine is driven by a water motor comprising a rotor 2 rigidly fixed to the spindle 1 by means of a nut 3. The spindle 1 is rotated by means of a jet of water admitted through a nozzle 4 into the inner chamber 35 of a housing 5 and impinging successively against a plurality of water buckets 6 mounted on the periphery of the rotor 2 as the rotor revolves. The water, having spent its force in driving the rotor, is evacuated through an outlet 40.

A load such as a basket, not shown, mounted on the lower portion of the spindle contains the material, such as sugar magma or massecuite, which is to be centrifuged. As the spindle rotates, a collar 7, a water guard 8, and two flanges 9 and 10 forming part of a labyrinth seal to be described hereinafter, together with an inner ball bearing race 11, all of which form a unitary structure with the spindle, rotate with it. The inner race 11 is spaced from an outer race 13 by a plurality of ball bearings 14 in a well known manner.

The outer fixed race 13 is supported on an annular ring 15 which, in turn, rests upon the shoulder of an upper spherical bearing 17. The upper spherical bearing 17 is supported by a socket 18 to form a ball joint. The socket 18 is supported in turn by a system of staggered washers 20, 21, and 22. As explained in the above noted patent, when the spindle 1 is displaced from the vertical, due to momentary unbalance in the load in the container, the displacement is communicated by movement of the inner race 11, through the ball bearing 14, to the outer race 13 and thence to the upper spherical bearing 17 which has limited freedom of rotation along the coasting bearing surface thereof. The socket 18 has limited freedom of lateral displacement along the upper surface of washer 20. The surfaces of the staggered washers 20, 21, and 22 impede this movement by friction.

A sleeve 23 is rigidly attached to the casing 5 by means of a threaded section 24. The upper portion of this sleeve is reduced in cross section. Since the spindle 1 must have some freedom of angular movement with respect to the fixed housing 5 and the sleeve 23 which is integral with the housing, an annular opening 25 is provided between the upper reduced end of the sleeve 23 and the spindle 1. Oil or other liquid lubricating medium is supplied to bearing 14 through a pipe or conduit 16 and the oil is withdrawn through another pipe or conduit 19.

The oil fills a chamber 26 in the inside of the upper spherical bearing 17 up to the level of the pipe 19. Two flanges 28 and 29 fixedly attached to a ring flange 30, which constitutes an axis for the annular motion of the spindle as a result of an unbalanced load, form a labyrinth seal with flanges 9 and 10. This seal will not of itself prevent the oil from draining from the system. As the spindle rotates, carrying with it the water guard 8, it has been found that the rotating water guard operates in a manner resembling an exhaust fan to draw the air through the opening 25, down into the lower portion of the inner oil compartment 26 and directly through the spaces and oiling ports between the inner and outer bearing races. The air passing through the oil and bearings has a tendency to carry the oil in a fine spray and at high speed such as 1800 R. P. M. the spray passes through the spaces between the stationary flanges 28 and 29 and the rotating flanges 9 and 10 which form the labyrinth seal. From this seal the spray passes through the channels 31 and 32 between a flange 33 of the housing 5 and the flanges 34 of the rotating water guard 8 into an inner chamber 35 of the housing 5. A considerable portion of the oil entrained in the air stream is accordingly carried into the inner chamber 35 where it is mixed with the water and lost.

To obviate this difficulty with its consequential loss of the lubricating medium and sometimes the complete destruction of the bearing, a slinger or hanger fixedly attached to the inner race 11 extends down into the oil chamber 26. The slinger 12 rotates with the spindle 1 and, when rotating, forces the oil up into the bearing 14. Concentric with the slinger and between the lower or driving part of the slinger and the bearing 14, a cooperating ring 27 fixedly held by the upper spherical bearing 17 is so disposed that it forms a passage below the oil chamber and the bearing 14. The passage is of such dimensions that it insures a constant supply of oil to the bearing 14 but substantially prevents the flow of air to the bearing. Preferably, the inner surface of the ring 27 has a helical groove in the form of a thread in juxtaposition with a portion of the surface of the rotating slinger. The tendency of the slinger is to force oil up to the bearing, while the stationary ring tends to force it downward. As a result, a seal for air is effectively formed between the slinger and the cooperating ring, while oil is supplied at the required rate to the bearing 14. The ring with the helical groove therein is preferably constructed so that when taken in relation with the direction of rotation of the spindle and slinger, the groove forces the oil downward. In the specific embodiment shown in the drawings, the direction of rotation of the spindle is indicated by an arrow. In this case, the ring is preferably grooved to form a right hand thread. The clear space separating the slinger and the grooved right hand thread ring is of the order of $\frac{1}{32}''$. The slinger in this embodiment has a diameter of about 6'' and in this specific case, the clearance between the slinger and the ring should not be greater than $\frac{3}{16}''$. The tendency of the slinger aided by the exhaust-like action of the water guard 8 tends to push both air and oil up through the space but the action of the grooved ring 27 is to direct the rising oil downward. The result of these opposing forces is an accumulation of oil in the $\frac{1}{32}''$ space which effectively seals it against the flow of air. This same action occurs even if the grooves are not cut in the form of a screw thread, but the screw thread arrangement as illustrated in the drawings is more positive. The effect of the water guard 8 and slinger 12 is to make the rising tendency preponderate slightly so that the oil rises slowly to the bearings but not with sufficient velocity to be carried through the labyrinth seal, draining back normally into the chamber 26 of the oiling system instead.

When a centrifugal device is provided with the lubricating seal of this invention, the lubricating medium dispersed into a fine spray is not carried out of the oil chamber. For example, in the system shown in the drawings, at high speed air passing through the opening 25, due to the rapidly moving parts, would tend to form a spray of the oil supplied to the bearings 14. The exhaust action of the water guard reduces the air pressure on the top of the bearings and the oil is forced upward. The effective oil seal between the slinger 12 and the ring 27, while permitting the oil to be supplied to the bearing 14, definitely prevents the air passing through the opening 25 from flowing to the bearing. As a consequence, the oil is not carried away, with the resulting conservation of oil and preservation of bearings.

While a preferred embodiment of this invention has been illustrated and described, various modifications may be made therein without departing from the scope of the appended claims. For example, other types of seal may be employed which provide a passage through which oil may be supplied to a bearing but through which air can not flow.

What is claimed is:

1. A gyratory centrifugal comprising a vertical shaft, a bearing for said shaft, an elongated slinger, rotating with said shaft, for driving oil up into said bearing, a seal including a stationary grooved member in juxtaposition with the outer surface of the upper portion of said slinger, the groove in said member being helical and of such helical sense in relation to the direction of rotation of said shaft that oil centrifuged from said slinger into said groove tends to be directed downwardly thereby.

2. In combination with a vertical shaft and a bearing therefor comprising inner and outer races, an annular oil reservoir concentric with said shaft below said bearing, a slinger rotating with said shaft and extending down into said reservoir, an annular passage for conveying oil centrifuged from said slinger and impelled by centrifugal force from said slinger to said bearing, and an air seal comprising a stationary member constituting an outer boundary of said passage above the lower end of said slinger, said stationary member having an interior peripheral groove into which oil is thrown by centrifugal force, whereby the oil massing at said groove blocks the flow of air through said passage and said bearing.

3. A high speed centrifugal separator for the treatment of sugar magma or the like comprising a vertical drive shaft and a bearing therefor comprising inner and outer races, a stationary sleeve concentric with and spaced from said shaft below said bearing, an annular oil trough comprising said sleeve as its inner wall, an elongated slinger concentrically attached to said shaft and extending down into said trough for centrifugally driving oil from said trough up through said bearing, means tending to force air through said bearing, said trough and around said sleeve thereby tending to blow oil spray out of said bearing, a stationary ring immediately below said bearing and comprising an outer boundary of the oil path leading to said bearing, said ring being interiorly, peripherally recessed and disposed to receive directly centrifuged oil whereby an oil barrier is formed blocking the flow of said air through said bearing.

4. A gyratory centrifugal comprising a vertical shaft, a bearing for said shaft, an elongated slinger rotating with said shaft for driving oil up into said bearing, an oil-passing air seal between the lower part of said slinger and said bearing, said seal comprising a circumferentially grooved member concentrically surrounding the upper part of said slinger and spaced therefrom whereby oil is centrifuged into the grooved portion of said member thereby forming an oil barrier to the flow of air through said bearing.

5. A combination in accordance with claim 3 in which said ring comprises means tending to direct said directly centrifuged oil downward whereby the massing of oil at said ring is enhanced.

CHARLES A. OLCOTT.